Dec. 10, 1946.          B. S. VILKOMERSON          2,412,482
DISCRIMINATOR-RECTIFIER CIRCUITS
Filed Aug. 10, 1944                    2 Sheets-Sheet 1
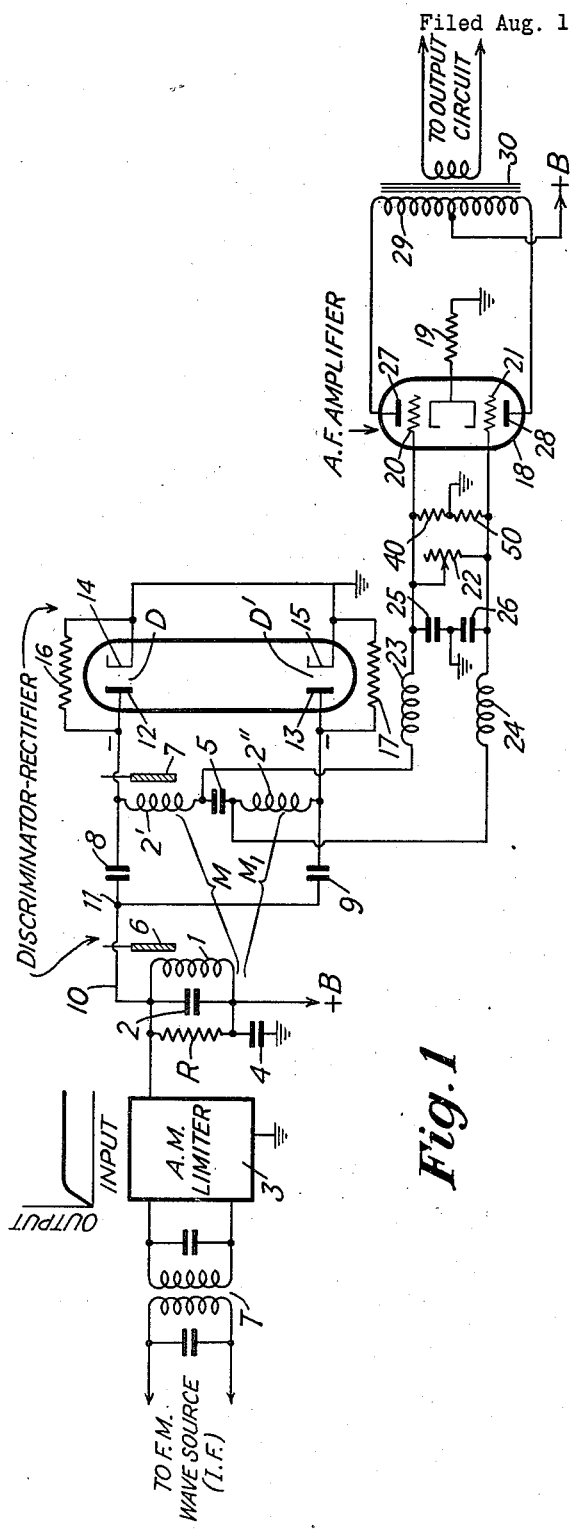
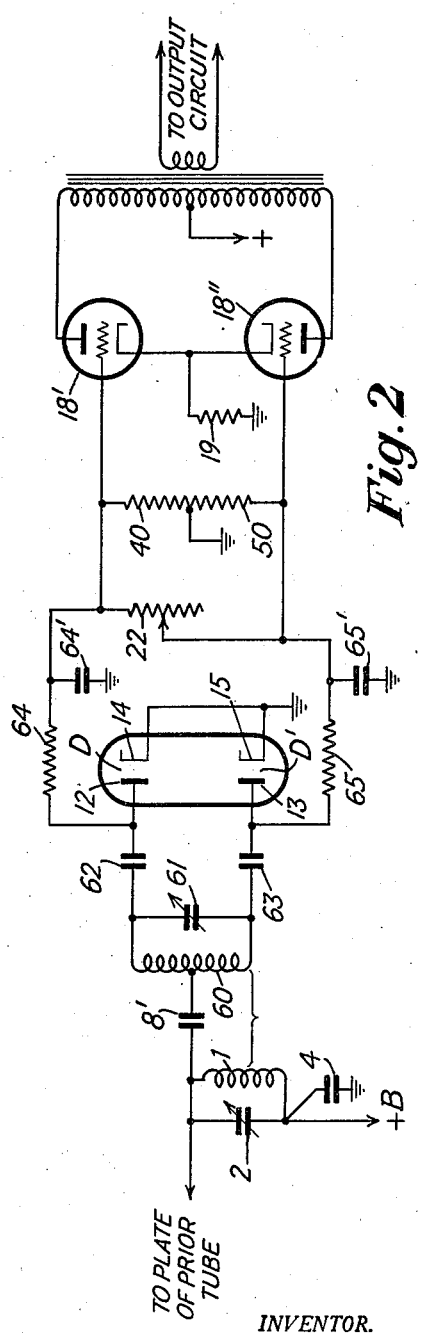
INVENTOR.
BENJAMIN S. VILKOMERSON
BY  H. G. Grover
ATTORNEY Dec. 10, 1946.   B. S. VILKOMERSON   2,412,482
DISCRIMINATOR-RECTIFIER CIRCUITS
Filed Aug. 10, 1944   2 Sheets-Sheet 2

INVENTOR.
BENJAMIN S. VILKOMERSON
BY
ATTORNEY

Patented Dec. 10, 1946

2,412,482

UNITED STATES PATENT OFFICE 2,412,482

DISCRIMINATOR-RECTIFIER CIRCUITS

Benjamin S. Vilkomerson, Camden, N. J., assignor to Radio Corporation of America, a corporation of Delaware Application August 10, 1944, Serial No. 548,854

8 Claims. (Cl. 250—27)

My present invention relates to discriminator-rectifier circuits for frequency-variable waves, and more particularly to novel and improved frequency modulation (FM) detector circuits.

The well known discriminator-rectifier circuit of the type disclosed and claimed by S. W. Seeley in U. S. Patent No. 2,121,103, granted June 21, 1938, employs a center-tapped secondary coil for the input transformer of the opposed signal rectifiers. This center-tapping is disadvantageous to the employment of inductance tuning by a relatively movable core, because the core, usually of comminuted iron, entering one end of the secondary coil causes the inductances of the two halves of the secondary to be unequal. Furthermore, a radio frequency choke coil is employed in the patented circuit from the center-tapping point on the secondary to the rectifier load circuit. In his application Serial No. 529,074, filed April 1, 1944, W. R. Koch has disclosed and claimed a highly effective circuit arrangement functioning in like manner to the aforesaid Seeley discriminator circuit, and providing an improved form of FM wave discriminator-detector circuit employing a minimum number of circuit components.

An important object of my invention is to provide an improved form of frequency modulation discriminator-detector circuit, which may be of the type disclosed and claimed in said Koch application, which is well-suited for inductance tuning of the input transformer windings although not limited thereto, and which employs a pair of diode rectifiers with common grounded electron emitters.

A more specific object of my invention is to provide a novel arrangement of the diode rectifiers in a discriminator-rectifier network, whether the discriminator-detector circuits are of the type shown in the aforesaid Seeley patent or that shown in the Koch application, each rectifier having its space current path directly shunted by its respective load resistor, and there being a common direct connection between the rectifier electron emission surfaces and ground whereby the circuit is especially suitable for use with filamentary cathodes in battery-operated receivers, with the indirectly-heated cathode of the double-diode type of tube, or with the multi-purpose type of tube having a common cathode and including two diode plates.

The novel features which I believe to be characteristic of my invention are set forth with particularity in the appended claims; the invention itself, however, as to both its organization and method of operation will best be understood by reference to the following description, taken in connection with the drawings, in which I have indicated diagrammatically several illustrative circuits whereby my invention may be carried into effect.

In the drawings:

Fig. 1 shows an embodiment of the invention as applied to a discriminator section of the general type shown in the aforesaid Koch application;

Figs. 2 and 3 show respectively different modifications employing a discriminator section of the type disclosed in the aforesaid Seeley patent.

Figure 3:
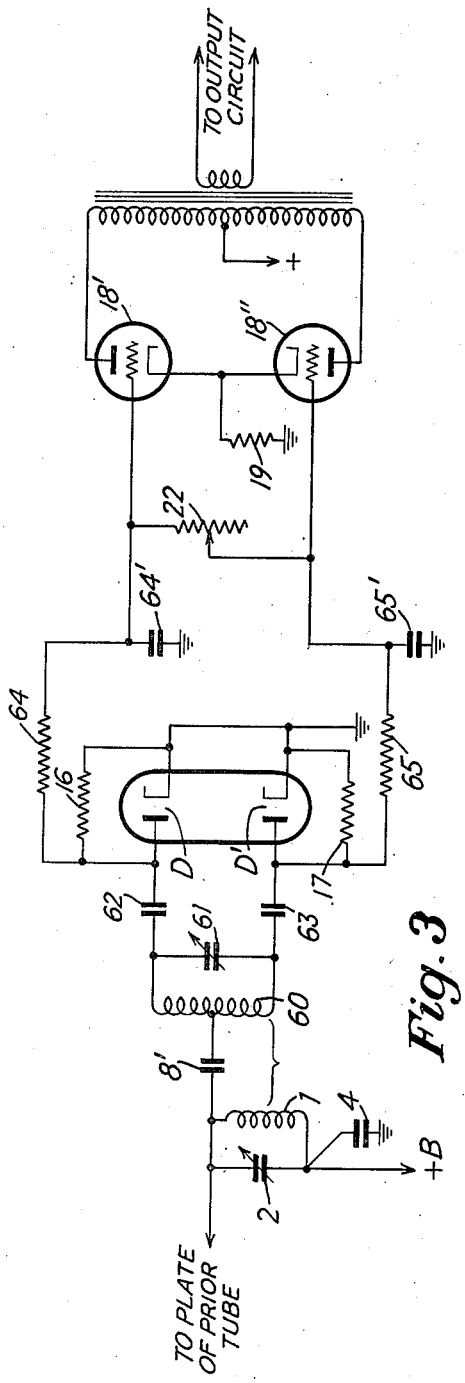

Referring now to the accompanying drawings, wherein like reference characters in the different figures designate similar elements, I have shown only so much of the circuits of an FM receiver system as is essential to a proper understanding of the invention. The discriminator-rectifier network of my present invention is not restricted in its utility to FM reception, however, since it may be employed to provide automatic frequency control (AFC) voltage for the local oscillator of a superheterodyne receiver of amplitude modulation (AM) carrier waves. The aforesaid Seeley patent shows the manner of this utilization of the invention. My circuit is, also, adapted to detect phase modulated (PM) waves. The particular frequency ranges or specified operating frequencies referred to hereinafter are to be understood as being purely illustrative. Further, the generic term "angle modulated carrier wave" as used herein is to be understood as including a frequency modulated carrier wave, a phase modulated carrier wave or related forms of modulated carrier waves. Those skilled in the art of radio communication know that an FM wave is produced by varying the carrier wave relative to its mean frequency to an extent proportional to the amplitude of the modulating frequency, and a PM wave differs in having a frequency deviation which increases with modulating frequency. The above generic expression "angle modulated" is, also, intended to include a modulated wave of constant amplitude wherein the modulation is neither pure FM nor pure PM, but contains common components and is, therefore, a hybrid modulation.

My present improved discriminator-rectifier circuits may be embodied in various well-known forms of receivers. For example, they may be employed in a superheterodyne receiver adapted to be operated in the presently-assigned FM band of 42–50 megacycles (mc.), and it is to be understood that the networks prior to transformer 1, 2', 2'' of Fig. 1 are of well-known construction. The FM waves, which according to present standards of FM broadcasting may have a frequency deviation up to a maximum of 75 kilocycles (kc.) on either side of the transmitter carrier frequency, are collected by the signal collector device, and, after selective radio frequency amplification if desired, are converted to an intermediate frequency (I. F.) by any suitable conversion means. Any desired operating I. F. value may be used such as, for example, 4.3 mc. After selective I. F. amplification the FM energy, having a mean or center frequency of 4.3 mc., may be subjected to amplitude limiting in order to remove any amplitude modulation which may have arisen during the course of propagation and reception of the waves.

Referring to Fig. 1, the primary winding or coil 1 derives FM waves from any suitable FM wave source. The coil may be connected in the plate circuit of the final I. F. amplifier tube or the amplitude modulation limiter tube 3 of a superheterodyne receiver. A condenser 2 is connected in shunt with coil 1 to provide the primary resonant circuit of the discriminator network. The upper end of coil 1 is to be understood as being connected to the plate of the prior signal transmission tube, for example, the amplitude limiter 3, whereas the lower end of the coil 1 is connected to the usual +B terminal of a suitable direct current energizing source. The limiter 3 may be of any well-known form, so long as the "input vs. output" characteristic thereof approximates the idealized form shown in Fig. 1 directly above the schematic box 3. The input transformer T is constructed to respond to a band of frequencies at least 200 kc. wide so as to provide suitable tolerances for passing the maximum frequency swing of the received FM waves. This is, also, true of the selector circuits prior to input transformer T.

The output transformer 1, 2', 2'' also is provided with a pass band width of 200 kc. The damping resistor R may be provided across the resonant primary circuit 2, 1 to insure a sufficiently broad pass band. The +B lead is bypassed to ground for intermediate frequency currents by condenser 4. The secondary coil is divided into two sections 2' and 2'', both of which are magnetically coupled to coil 1 as indicated by brackets M and M₁. The secondary winding may be divided into the two sections 2' and 2'' in any suitable manner. As shown, the condenser 5 is inserted between the inner ends of sections 2' and 2'' so that condenser 5 effectively separates the latter. Sections 2' and 2'' are preferably of equal value thereby reducing the required effectiveness of choke coils 23 and 24. The condenser 5 is an isolation condenser, and acts to bypass I. F. currents to which it has a relatively low impedance. Condenser 5 may have a value, for example, of 200 micromicrofarads, and blocks audio frequency as well as direct currents. The coil 2', 2'' is shunted by condensers 8 and 9 connected in series. The condensers 8 and 9 provide resonating capacitance for the discriminator secondary circuit. Thus, circuit 2', 2'', 5, 8, 9 is the resonant secondary circuit of the discriminator network. Each of coils 1 and 2', 2'' is preferably of the inductance tuner type.

Those skilled in the art of radio receiver construction are fully acquainted with the manner of adjusting the inductance value of a coil by means of an adjustable iron core. The numeral 6 designates the iron core or plug adapted to adjust the inductance value of coil 1, while numeral 7 indicates the corresponding adjustable iron core for selecting the inductance value of coil 2', 2''. In general, the iron plugs or trimmers 6 and 7 will be individually adjusted so that each of the primary and secondary circuits is tuned to the operating I. F. value, which has been stated, by way of example, as being 4.3 mc. Coil 2', 2'' may have its inductance selected so as to be double the inductance value of coil 1 at the normal resonant condition of the two circuits including them. The condensers 8 and 9 are chosen equal in magnitude. These are only illustrative constants. With suitable values for the condenser elements 8 and 9, the inductance of coil 2', 2'' at twice the value of the inductance of coil 1 will provide a resonant frequency for the secondary circuit which is substantially equal to the resonant frequency of the primary circuit.

Unlike the aforesaid discriminator circuit of the Seeley patent, the high alternating potential side of primary circuit 1, 2 is connected by lead 11 to the junction of condensers 8 and 9. This will result in establishing the junction point 11 at the same alternating potential as the high alternating potential side of the primary circuit. At the same time each of condensers 8 and 9 will function as a direct current blocking condenser to prevent application of +B voltage to the opposed rectifiers D and D'. The condensers 8 and 9 offer a relatively low impedance to the I. F. voltage at the primary so that substantially the full value of primary voltage is applied to the respective diode anodes 12 and 13. The rectifiers D and D' are shown by way of example as diodes having their electrodes embodied in a common tube envelope.

This invention is not limited to a tube containing but two diode sections in a single envelope. It is to be understood that numerals 14 and 15 of Fig. 1 merely designate in schematic manner a pair of separate electron emission surfaces for respective anodes 12 and 13. The emission surfaces may be separate cathodes, as of the directly-heated or indirectly-heated types; they may be separate portions of a common cathode; they may be the common cathode, filamentary or indirectly heated, of a multi-purpose tube having two diode plates and a separate triode or pentode section. In any of these instances the two diodes will have electron emission surfaces connected in common to ground. Let it be assumed that in Fig. 1 the cathodes 14 and 15 are separate portions of a common cathode, as in a 6SQ7 or 1F6 type tube, and that the grid and plate of the triode section are grounded and ineffective. The two diode sections are shown as separate, however, so as to make it clear that the 6H6 type of tube can also be used.

The anode 12 of diode D is connected to one of the terminals of condenser 8 and to the upper end of coil section 2', whereas the anode 13 of diode D' is connected to one of the terminals of condenser 9 and to the lower end of coil section 2''. The other terminals of condensers 8 and 9 are connected together. Unlike in the Koch application, the electron emission surfaces 14 and 15 of the diodes D and D' respectively are directly connected together and to ground. Numeral 16 designates the load resistor operatively associated with rectifier D and connected directly in shunt with the space current path of the diode. Similarly, load resistor 17 is connected directly between the anode and cathode of its diode D', and is, therefore, directly in shunt with the space current path of that diode.

There will be developed across each of resistors 16 and 17 respective voltages produced by rectification of I. F. signal currents. It will be noted that the rectified voltages developed across resistors 16 and 17 will not be added in polarity opposition as in the Koch application, since the anode ends of resistors 16 and 17 are isolated by condenser 5. The cathode terminals of resistors 16 and 17 are grounded, and rectified voltages of negative polarity (to ground) are separately taken off from the anode ends of resistors 16 and 17. The modulation or audio frequency components of the rectified voltages are utilized by the network shown in the drawings.

The audio frequency amplifier tube 18 is shown as a twin triode tube, say one of the 6SN7 type by way of specific illustration. Separate triode tubes may be employed if desired. The common cathode connection of tube 18 is connected to ground by the bias resistor 19, while control grids 20 and 21 are connected to opposite ends of the shunt adjustable volume control resistor 22. Grid 20 is connected to the lower end of coil section 2' through I. F. choke coil 23, while the adjoining end of coil section 2" is connected to grid 21 through I. F. choke coil 24.

The condensers 25 and 26 each function to bypass to ground any I. F. currents which get through choke coils 23 and 24. The plates 27 and 28 are connected to the opposite ends of primary winding 29 of output transformer 30. The center tap on winding 29 is connected to the +B voltage supply lead. The control grids 20 and 21 are, therefore, connected in push-pull relation to the output resistors 16 and 17, while the plates 27 and 28 are also connected in push-pull relation. The direct current return paths for grids 20 and 21 are respectively through resistors 16 and 17.

In order clearly to present the advantages of the present improvement, the manner of operation of the circuit will now be explained. Let it first be assumed that the FM energy applied to the primary circuit 1, 2 is at the mean or carrier frequency of 4.3 mc. The condensers 8 and 9 through which signal energy is fed to each of anodes 12 and 13 are of low reactance values, and any phase shift of the I. F. signal energy produced by them will be negligible. Further, the signal energies applied through condensers 8 and 9 will be of like polarity. However, the anodes 12 and 13 are, also, connected to the opposite ends of coil sections 2', 2". Due to the magnetic coupling between the discriminator tuned circuits there will occur a 90° phase shift at the carrier frequency. Hence, the signal energy will be applied to anodes 12 and 13 from respective ends of coil sections 2' and 2" in opposite polarity, but in each case in phase quadrature with the signal energy at the high potential side of the primary circuit. It follows, therefore, that the resultant signal voltages effectively applied to anodes 12 and 13 will be equal at the carrier frequency, and the rectified voltages developed across respective resistors 16 and 17 will be of equal magnitude. Since these rectified voltages are separately applied to respective grids 20 and 21 in like negative polarity relative to ground, the result will be that when the signal energy is at the predetermined reference frequency of each of the primary and secondary circuits there will be no alternating current output from the triode sections of tube 18.

Assume, now, that at some later time the I. F. signal energy has a frequency different from the predetermined mean frequency of the applied waves, which is also the predetermined frequency of the primary and secondary circuits of the discriminator transformer. There will now occur a phase shift in the signal energy transmitted through the tuned transformer which is greater or less than 90°, depending upon the direction and extent of the difference between the frequency of the applied signal energy and the predetermined resonant frequency of the tuned primary and secondary circuits. The signal energy transmitted in parallel through condensers 8 and 9 will have suffered no relative phase shift due to the non-selective phase-shift character thereof. That is to say, the signal energy applied through condensers 8 and 9 to the anodes 12 and 13 suffers no phase shift which need be taken into account, whereas the signal energy transmitted through the discriminator transformer undergoes a variable phase shift from the normal quadrature phase relation depending upon the direction and amount of frequency deviation of the signal energy with respect to the carrier frequency.

This means that there will be applied to the anodes 12 and 13 resultant signal voltages of different magnitudes, as is well-known to those skilled in the art. Hence, the rectified voltages across resistors 16 and 17 will be of different magnitudes, and the negative voltages at the anode end of each of resistors 16 and 17 will be of relative magnitudes dependent upon the extent and sense of frequency deviation of the signal energy with respect to the predetermined mean frequency. The relatively rapid frequency variation of the signal energy corresponds to the modulation voltage which is transmitted on through each of choke coils 23 and 24.

It will now be seen that I have provided an FM discriminator-detector circuit in which both diode electron emitters 14 and 15 are grounded. This is of advantage in the case of a receiver using filamentary cathode tubes, as in the case of battery-operated sets. Although cathodes 14 and 15 are connected to a common ground point, the diodes are effectively isolated for direct currents. Thus, the direct current circuit for each diode is traced as follows: From anode 12 through resistor 16, to cathode 14 and thence to ground; and from anode 13, through resistor 17, to cathode 15 and ground. Alternatively, resistors 16 and 17 could be omitted, and the series resistors 40 and 50 could be employed between grids 20 and 21, the junction of the resistors being grounded. The direct current path for each diode rectifier would be in that case: From anode 12 through coil section 2', choke 23 and resistor 40 to ground. Similarly, there exists a path from anode 13 through coil section 2", choke 24 and resistor 50 to ground. If desired the source of the rectified voltage may be considered the successive negative charges placed on the right hand sides of each of condensers 8 and 9 during signal reception by the unidirectional conductivity of the two diodes. It is the leaking off of these accumulated negative charges through load resistors 16 and 17, or alternatively through resistors 40 and 50 if they are used, and the recharging by the received signal which supplies the direct current and audio frequency output of the discriminator rectifiers. While resistors 40 and 50 are shown in Fig. 1 since they do not substantially affect the operation of the circuit, they may be preferably omitted if resistors 16 and 17 are used.

The I. F. currents flow through each diode circuit in the following manner: The I. F. voltage produced across the primary circuit 1, 2 by the limiter 3 is combined in series with one-half the voltage induced in each of sections 2' and 2", and is impressed across each diode and ground. In the case of diode section D the I. F. current flows from the high potential side of circuit 1, 2 through lead 10 and condenser 8, through diode D to ground, and back through condenser 4 to the primary circuit 1, 2. In the case of diode section D' the I. F. current from the primary circuit 1, 2 flows through condenser 9, through diode D', and returns through ground and condenser 4 to the primary circuit.

Adjusting the core 7 will, unless the coils are especially designed to prevent it, affect the relative inductive magnitudes of coil sections 2' and 2", but chokes 23 and 24, by isolating the ground point from the coil sections at intermediate frequency, make this unbalance of no consequence. The voltage still divides across the two diodes D and D' in accordance with their respective impedances. Chokes 23 and 24 can be eliminated and the balance maintained if core 7 is replaced with a variable tuning condenser connected across the outside ends of coil sections 2' and 2", i. e., in parallel with condensers 8 and 9 in series. The use of core 6 is optional since the tuning of the primary circuit is not very critical. If the values of the inductance of coil 1 and capacitance of condenser 2 are kept to close tolerances, adjustable tuning may be dispensed with. However, it may be more economical to use wide-tolerance components and tune the primary circuit with core 6.

The present circuit is well suited for use with filamentary cathode tubes. With heater-cathode type tubes there is eliminated the possibility of audio frequency hum caused by heater-cathode leakage in the "high" diode. By "high" diode is meant the type of discriminator wherein one diode has its cathode at ground potential, and the other diode cathode is at a high audio and direct current potential to ground but is bypassed to ground for radio frequency currents only. If the radio frequency bypass condenser is too large, it will also bypass a portion of the audio output of the discriminator. My present invention makes feasible the use of a standard duo-diode common cathode (grounded) tube in a frequency discriminator circuit.

A most important advantage of this circuit arrangement is that it permits the use of a multipurpose tube having a common cathode and including two diode plates. Such tubes currently include an additional triode or pentode section which utilize a common cathode, as depicted in Fig. 4 of this application. The triode section or pentode section may be used for other functions, or may be rendered ineffective. Furthermore, the symmetry of the present discriminator network to ground should give better radio frequency balance. The audio frequency signals feed a push-pull amplifier in the present circuit thereby eliminating the need of a phase inverter tube, as is required for push-pull operation in the case where the differential resultant voltage of resistors 16 and 17 is used. In Fig. 4, described hereinafter, I have, however, shown a method of utilizing the triode section of a duo-diode triode tube as an audio amplifier fed from the single-ended output of the pair of rectifiers. Both low mu triodes in tube 18, and the limiter 3 saturating on a small voltage, there is no need for guarding against cut-off of each triode grid by the respective negative voltages produced by the rectifiers. However, if the output of the limiter 3 is high and/or the triodes have high amplification factors, the negative voltages produced by diodes D and D' may be high enough to cut off the plate currents of the pair of triodes. Respective direct current blocking condensers may be inserted, in such case, in series in each side of the line to resistors 40 and 50. This is, also true for the circuits of Figs. 2 and 3.

As stated heretofore, the discriminator section may be that of the Seeley patent. In Fig. 2 I have shown a modification wherein the primary circuit 1, 2 has its high potential side connected by the direct current blocking condenser 8' to the midpoint of secondary coil 60. The condenser 61 shunted across coil 60 tunes the secondary circuit to the same I. F. value as primary circuit 1, 2. The anodes 12 and 13 of diode sections D and D' are connected to opposite ends of coil 60 through respective condensers 62 and 63. The electron emission surfaces 14 and 15 are connected in common to ground as in the case of Fig. 1.

The anode 12 is connected to ground through a path consisting of resistors 64 and 40 in series. The anode 13 is connected to ground through a path consisting of resistors 65 and 50 in series. Instead of using the twin-triode type of tube 18, separate triodes 18' and 18" are used as the audio frequency amplifiers. The variable resistor 22 is, again, connected in series between the input grids of the audio frequency amplifier sections and functions as a manual volume control device. Each of resistors 64 and 65 may have a magnitude of 10,000 ohms, and may function as an I. F. choke, or as a substantial portion of the load resistor of respective diodes D and D'. The right hand end of each of resistors 64 and 65 is bypassed to ground by respective condensers 64' and 65'.

Where the resistors 64 and 65 function as I. F. choke elements, then resistors 40 and 50, each of which may have a magnitude of 0.25 megohm, will function as the load resistor elements of respective diodes D and D'. In the modification of Fig. 2 there is provided across each half of coil 60 the resultant vector voltage of the primary signal voltage and one-half the signal voltage induced from the primary, as was explained in connection with Fig. 1 and as is well known to those skilled in the art. The resultant vector voltages applied to anodes 12 and 13 are equal at the reference frequency of the discriminator circuits. However, the voltages will vary in accordance with the sense and magnitude of frequency variation from the reference frequency. As a result, the rectified voltages (relative to ground) at the upper end of load resistor 40 and the lower end of load resistor 50 respectively will vary in accordance with frequency variation of the applied signal energy, as hereinbefore explained.

Figure 4:
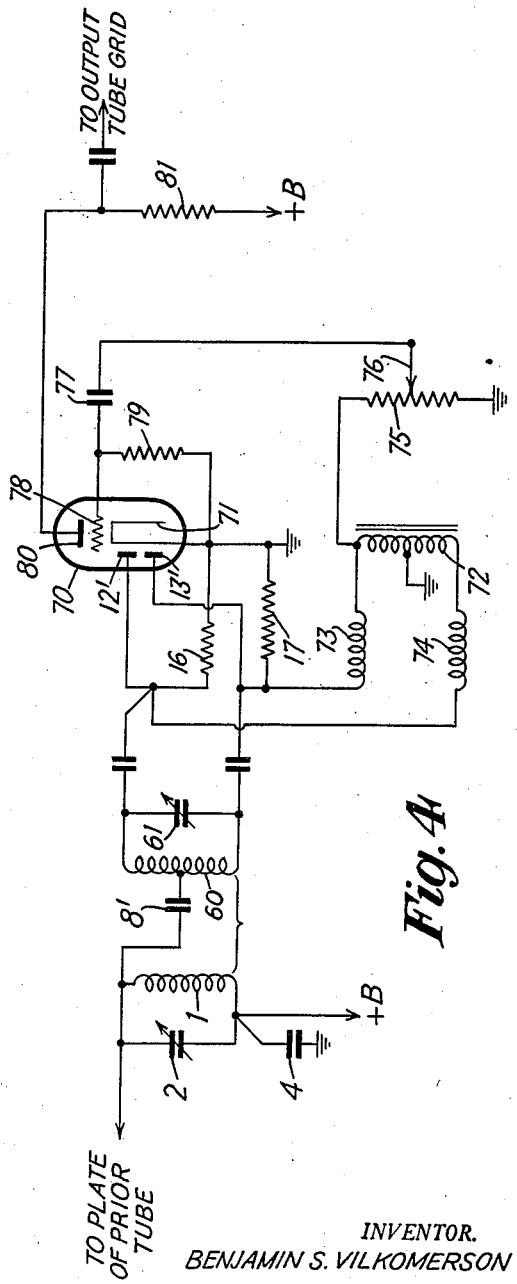
Fig. 4 shows a further modification employing a multi-purpose tube.

The modification of Fig. 3 differs from that shown in Fig. 2 only in that the diodes D and D' use individual load resistors 16 and 17 as in the case of Fig. 1. The resistors 64 and 65 function solely as I. F. chokes. The resistors 40 and 50 of Fig. 2 are omitted, since they are unnecessary because the control grids of triodes 18' and 18" return to ground through respective paths 64, 16 and 17, 65. It will be understood that the circuit of Fig. 3 functions substantially in the same manner as in Fig. 2, except that the load resistors of the diode rectifiers in Fig. 3 are closer in their circuit connections to those provided in Fig. 1. It will be clearly understood that in each of Figs. 1, 2 and 3 the diode sections D and D' may be provided by a common cathode provided with a pair of separate anodes as suggested in the modification of Fig. 4.

In the arrangement of Fig. 4 I have shown a modification of the arrangement of Fig. 3, wherein the triode section of the detector tube is utilized as a single-ended audio frequency amplifier for the audio output of the opposed diode rectifiers. It will be understood that the opposed rectifiers and their discriminator input circuit are substantially the same as in Fig. 3. The multipurpose tube 70, which may be a 6SQ7 type tube, has its common cathode 71 at ground potential whereas the anodes 12' and 13' are connected to the high potential ends of respective load resistors 16 and 17. A center-tapped audio frequency reactor 72 has one end thereof connected through an I. F. choke coil 73 to the anode 13', while the choke coil 74 connects the anode 12' to the opposite end of reactor 72.

The center tap of reactor 72 is grounded, and the end of the reactor connected to choke 73 is connected to ground through the resistor 75 of a volume control device whose adjustable tap 76 is connected through audio frequency coupling condenser 77 to the control grid 78. The resistor 79 returns grid 78 to ground, and the plate 80 of tube 70 is connected to a suitable point of positive potential +B through plate resistor 81. It will be observed that in this modification of the invention the control grid 78 of the triode section of tube 70 is driven from one half the output reactor 72 of the FM detector circuit.

In this way a single-ended audio output is secured, instead of a push-pull output as in the case of Figs. 1, 2 and 3. When the slidable tap 76 is at the upper end of resistor 75 there will be maximum audio signal voltage applied to the control grid 78. It will be understood that the functioning of the discriminator-rectifier circuit is the same as was described in connection with Figs. 2 and 3. It will, also, be observed that what is common to each of Figs. 1 to 4 inclusive is that the opposed diode rectifiers have a common grounded electron emitter connection, and that each diode section is shunted by a load resistance element, while modulation output connections are made to points on the load elements which are of like direct current polarity and opposite audio polarity, and of magnitudes dependent upon the value of the instantaneous frequency of the applied FM signals with respect to a predetermined reference frequency.

While I have indicated and described systems for carrying my invention into effect, it will be apparent to one skilled in the art that my invention is by no means limited to the particular organizations shown and described, but that many modifications may be made without departing from the scope of my invention.

What I claim is:

1. In a discriminator-rectifier circuit, a first resonant circuit comprising a coil and a pair of series-connected condensers arranged in shunt with the said coil, a second resonant circuit having a normal frequency equal to the normal frequency of the first resonant circuit, means reactively coupling said two resonant circuits, conductive means connecting one side of said second circuit to the junction of said pair of condensers, a first diode rectifier having its anode connected to one end of said coil, a second diode rectifier having its anode connected to the opposite end of said coil, an isolation condenser interposed between sections of said coil, a first load resistor connected in shunt to one of said rectifiers, a second load resistor connected in shunt with the second rectifier, means for establishing the cathode ends of both of said load resistors at ground potential, and a separate rectified voltage utilizing means connected to the anode end of each load resistor.

2. In a frequency discriminator system, a first circuit comprising a coil and a condenser tuned to a predetermined signal frequency, a second circuit comprising a second coil shunted by a pair of series-arranged capacitors, the second circuit being tuned to said predetermined frequency, a direct connection from one side of the first tuned circuit to the junction of said two capacitors, a direct current blocking condenser in a series circuit between two sections of said second coil, a pair of diodes, each diode having its anode connected to a respective end of the second coil, separate resistors respectively shunting said diodes, means grounding the cathodes of both diodes, and modulation utilization circuits connected to the opposite sides of the blocking condenser.

3. In combination, a parallel resonant circuit tuned to a predetermined signal frequency, a coil magnetically coupled to said parallel resonant circuit, a pair of condensers connected in series relation across said coil and cooperating with the latter to provide a second parallel resonant circuit tuned to said predetermined frequency, a connection between one side of said first resonant circuit and the junction of said condensers, a direct current blocking condenser series-inserted between sections of said coil, and means for individually adjusting the inductance magnitudes in each of said resonant circuits.

4. In combination, a primary circuit, means for supplying angle modulated carrier energy thereto, a secondary circuit resonant to the mean frequency of said carrier energy and comprising a coil and a pair of series-connected condensers arranged in shunt with said coil, said circuits being inductively coupled with each other, means conductively connecting an alternating current potential point on the primary circuit to the junction of said pair of condensers, a diode rectifier having its anode connected to one end of said coil and to one of said pair of condensers, a second diode rectifier having its anode connected to the opposite end of said coil and to the other of said pair of condensers, a first load resistor connected in shunt to one of said rectifiers, a second load resistor connected in shunt with the second rectifier, means for establishing the cathode end of each one of said load resistors at a common relatively fixed potential, a direct current blocking condenser inserted in series between half sections of said secondary coil, and a push-pull amplifier having separate modulation signal voltage connections to respective points of like direct current polarity but opposite audio polarity of said load resistors.

5. In combination, a first resonant circuit comprising a coil and a pair of series-connected condensers, a second resonant circuit having a normal frequency equal to the normal frequency of the first resonant circuit, means reactively coupling said two resonant circuits, means connecting one side of said second circuit to the junction of said pair of condensers, a first diode rectifier having its anode connected to one end of said coil, a second diode rectifier having its anode connected to the opposite end of said coil, a condenser interposed between sections of said coil, a first load resistor connected in shunt to one of said rectifiers, a second load resistor connected in shunt with the second rectifier, and means for establishing the cathode ends of both of said load resistors at ground potential.

6. In a frequency discriminator system, a first circuit comprising a coil and a condenser tuned to a predetermined signal frequency, a second circuit comprising a second coil shunted by a pair of series-arranged capacitors, the second circuit being tuned to said predetermined frequency, a direct connection from one side of the first tuned circuit to the junction of said two capacitors, a direct current blocking condenser in series circuit between two halves or equal sections of said second coil, a pair of diodes, each diode having its anode connected to a respective end of the second coil, separate resistors of equal magnitude respectively shunting said diodes, means grounding the cathodes of both diodes, and separate modulation utilization circuits connected to the opposite sides of the blocking condenser.

7. In combination, a parallel resonant circuit tuned to a predetermined signal frequency, a coil magnetically coupled to said parallel resonant circuit, a pair of condensers connected in series relation across said coil and cooperating with the latter to provide a second parallel resonant circuit tuned to said predetermined frequency, a connection between one side of said first resonant circuit and the junction of said condensers, a direct current blocking condenser series-inserted between equal sections of said coil, and means for individually adjusting the inductance magnitudes in each of said resonant circuits.

8. In combination, a primary circuit, means for supplying angle modulated carrier energy thereto, a secondary circuit resonant to the mean frequency of said carrier energy and comprising a coil and a pair of series-connected condenser arranged in shunt with said coil, said circuits being inductively coupled with each other, means conductively connecting an alternating current potential point on the primary circuit to the junction of said pair of condensers, a diode rectifier having its anode connected to one end of said coil and to one of said pair of condensers, a second diode rectifier having its anode connected to the opposite end of said coil and to the other of said pair of condensers, a first load resistor connected in shunt to one of said rectifiers, a sceond equal load resistor connected in shunt with the second rectifier, means for establishing the cathode end of each one of said load resistors at a common relatively fixed potential, a direct current blocking condenser inserted in series between the equal half sections of said secondary coil, and a push-pull amplifier having separate modulation signal voltage connections to respective points of like polarity of said load resistors.

BENJAMIN S. VILKOMERSON.